J. LAURELL.
TOBACCO STRIPPING AND BOOKING MACHINE.
APPLICATION FILED APR. 27, 1920.

1,380,813.

Patented June 7, 1921.
2 SHEETS—SHEET 1.

WITNESS:
William Miller

INVENTOR.
John Laurell
BY
Hauff Harland
ATTORNEYS

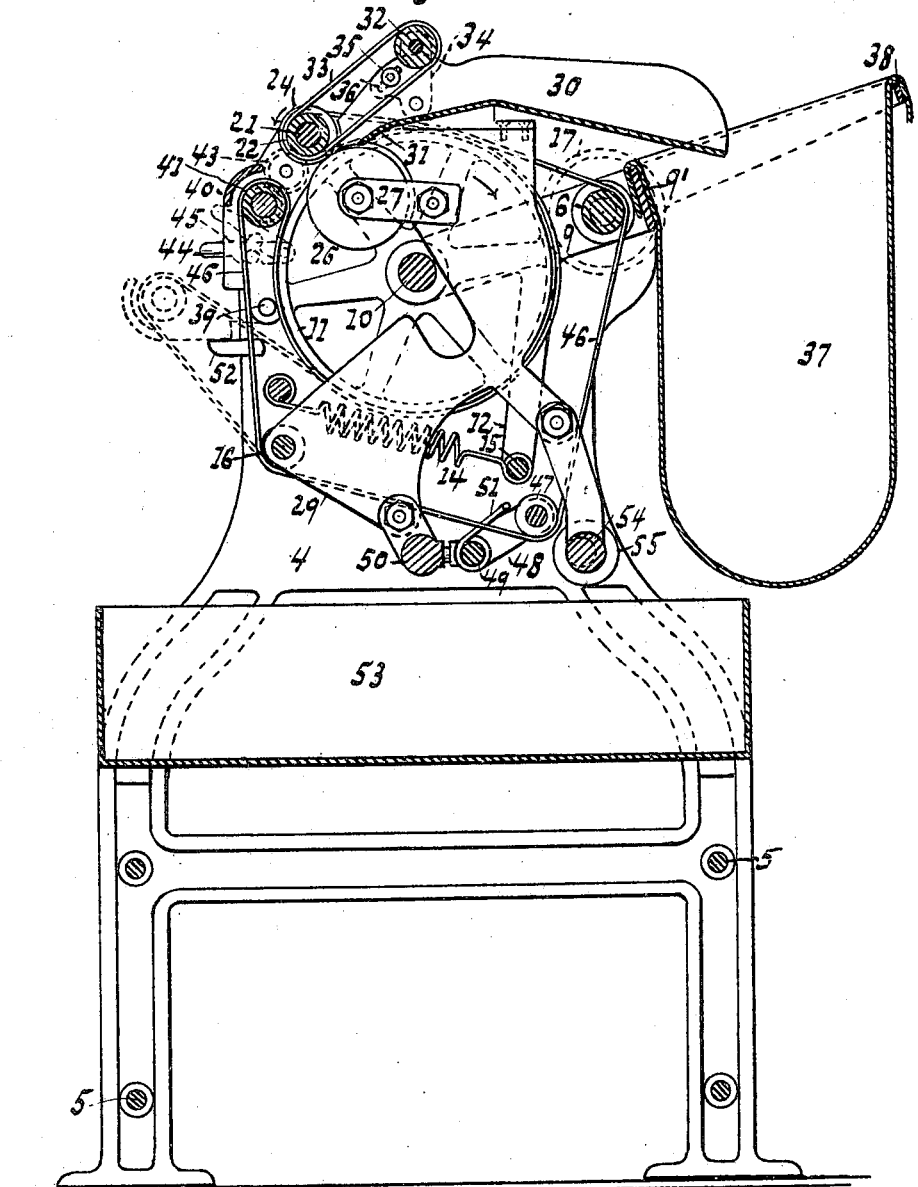

UNITED STATES PATENT OFFICE.

JOHN LAURELL, OF NEWARK, NEW JERSEY, ASSIGNOR TO I. LEWIS CIGAR MANUFACTURING CO., OF NEWARK, NEW JERSEY, A CORPORATION OF NEW JERSEY.

TOBACCO STRIPPING AND BOOKING MACHINE.

1,380,813.  Specification of Letters Patent.  Patented June 7, 1921.

Application filed April 27, 1920. Serial No. 376,988.

*To all whom it may concern:*

Be it known that I, JOHN LAURELL, a citizen of the United States, residing at Newark, county of Essex, and State of New Jersey, have invented new and useful Improvements in Tobacco Stripping and Booking Machines, of which the following is a specification.

This invention relates to a machine for stripping and booking leaf tobacco, in which a pair of rotary oscillating cylinders are adapted to book the division of the leaf after they are cut by a revolving circular knife, in order to strip or separate the stem from the leaf.

Heretofore, in machines of this kind, the stem when stripped from the leaf was guided partly around the cylinders and sometimes it would get out of alinement and tangle with the adjacent belts, causing them to come into contact with the knife thereby cutting the belts and rendering them useless.

The object of the present invention, is to divert the stem after it is separated from the leaf in a path away from the cylinders so that it cannot become tangled with the belts or clogged between the cylinders.

The invention is designed to provide means located above the cylinders for guiding the stem in a different path relative to the leaf after it is separated so it will not come into contact with the cylinders.

Another object of the invention is to provide a yielding idler roller to tension the belts and compensate for the stripped leaves which are packed about the cylinders.

Another object of the invention is to connect the cylinders with coiled springs made to counter-balance, and at the same time permit the cylinders to have a certain definite swinging movement and thus accommodate an accumulation of the stripped leaves arranged on the cylinders.

The invention resides more particularly in the novel combinations hereinafter described and claimed, reference being made to the accompanying drawings in which:

Fig. 3 is a vertical section of Fig. 1.

Figure 1:
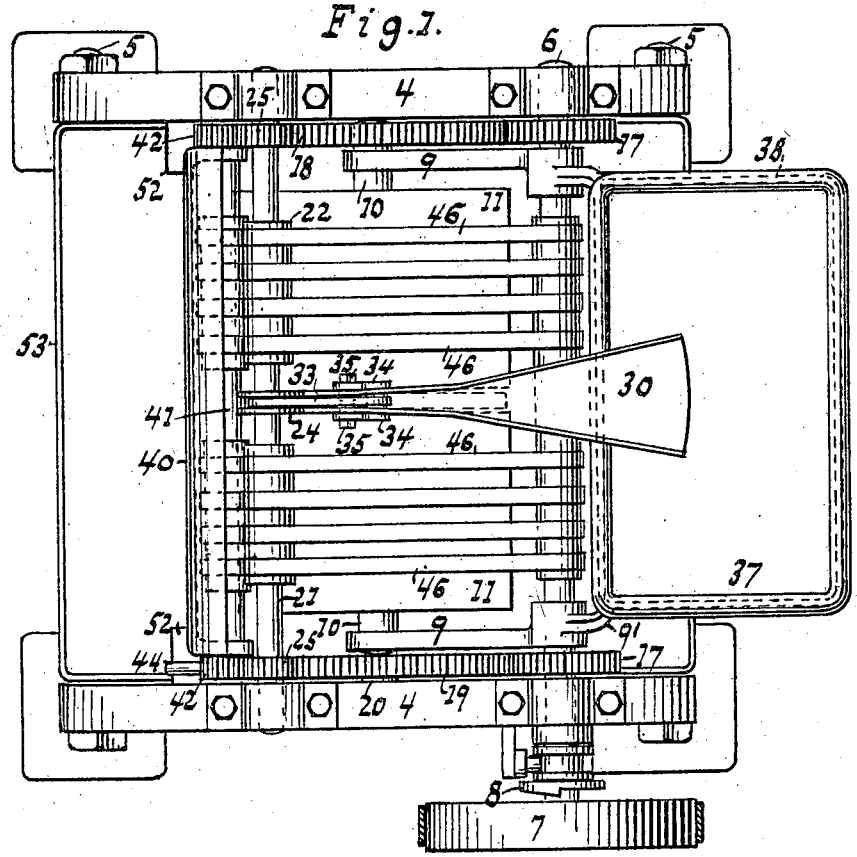
Figure 1 represents a plan view of a machine embodying this invention.
Figure 2:
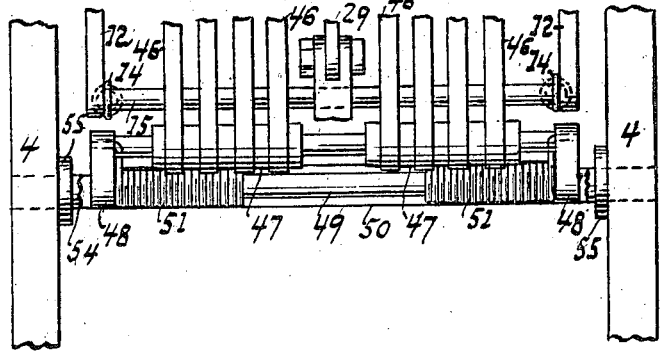
Fig. 2 is a detail rear view showing the yielding idler roller connections.

In the drawings the numeral 4 designates a pair of side frames which are connected together by transverse rods 5 bolted to the frames. Mounted on the upper rear portion of the frames is a shaft 6 driven by a pulley 7 loosely mounted on the shaft. A sliding clutch 8 arranged on the shaft is made to at times coact with the pulley to control the operation of the machine. On the shaft is mounted a hanger having a pair of longitudinal arms 9 best seen in Fig. 1, and a bail 9' extending transversely at the rear to connect the two arms. The forward ends of the arms carry a shaft 10 having mounted thereon a pair of cylinders 11 for carrying the tobacco leaves. Each arm is equipped with a downward extension 12 as indicated in Fig. 2 and springs 14 having one end hooked on to a rod 15 joining the arms, and the other end attached to a rod fixed at the front of the frame will have a tendency to elevate the cylinders. By having the power of the springs exerted between the weight or load and the fulcrum of the hanger, the stress on the shaft 6 is lightened and consequent wear on the bearings is reduced.

The means for rotating the cylinders include a pair of pinions 17 secured to the shaft 6 and a pair of gears 18 and 19 engaged by the pinions. The gear 18 is carried by the shaft supporting the cylinders, while the gear 19 is mounted on a short shaft 20 supported in the side frame.

At the upper front portion of the frames is journaled a shaft 21 having rollers 22 and a rotary knife 24 located above the cylinders, a pair of pinions 25 are carried by the shaft and are engaged by the respective gears 18 and 19 to rotate the knife. The knife consists of two disk cutters or rims formed on a central hub for severing the leaf adjacent to each side of the stem. A circular die 26 coacts with the knife to cut the leaf and at the same time guide the stem.

The die is rotatively mounted on the forward end of a bracket 27, while the other end of the bracket is secured to a plate 29 fixed between the two cylinders. The upper portion of the plate has secured to it a chute 30 having an inclined bottom, the forward end 31 of which is bent downward to form a finger to pick up the end of the stem after it is stripped from the leaf. The mouth of the chute sets between the two cylinders close to the knife so that none of the stems can be whirled about the cylinders. On the top of the chute is mounted a roller 32 having a belt 33 engaging the hub of the cutter as indicated in Fig. 1. The roller 32 is mounted to revolve between two levers 34 swingingly pivoted to the sides of the chute. The levers can be moved a certain distance to slack or pull the belt taut, when bolts 35 coacting with slots 36 in the levers are loosened. It will be readily understood, that when the machine is in action the belt 33 will grasp the stem and feed it toward the chute where it travels backward until it is dropped into the mouth of a bag 37 suspended from an arm 38 and the bail 9′ at the rear end of the hanger.

At the forward portion of the frames is hinged at 39 a swinging section 40 carrying at its upper portion a roller 41 having pinions 42 geared by intermediate gears 43 to the pinions on the cutter shaft. The section is normally prevented from swinging downward or locked in its upright position by means of a latch 44 coacting with a stud 45 projecting from the side of the section. As shown in the drawing there are a series of belts 46 engaging the roller. These endless belts pass about the top of the roller and the inner portion passes down around the cylinders and about the roller 22, thence about the roller on the main shaft 6 and down to an idler roller 47 below the cylinders.

The idler roller is carried by a two armed rock lever 48 swingingly mounted at 49 to a bracket projecting from a bar 50 fixed to the frames. A pair of coiled springs 51 mounted on the bracket, best seen in Fig. 3, tend to press the free ends of the rock lever downwardly to hold the belts taut. From the idler roller the belts travel up to a roller 16 and thence around the top of the roller 41 mounted on the swing sections and down around the cylinders.

When it is desired to give access to the cylinders or to permit the pack of leaves between the belts and the cylinders to be removed, the latch can be swung up as indicated in dotted lines in Fig. 1, and the pack will travel outward conveyed by the movement of the belt. The said section when open strikes against a stop 52 formed on the frames. A receptacle 53 arranged below the cylinders is made to catch any scraps of tobacco torn from the leaves.

The end of the leaf is inserted between the knife 24 and the upper portion of the shield forming the top of the swing section and is gripped by the belts actuated by the rollers 22. The stem is guided by the center belt 33 toward the finger 31 and into the chute, while the severed leaf sections are gripped by each series of belts 46 and made to travel about the cylinders. The endless belt 46 will draw the idler roller 47 upward against the action of the springs 51 when a pack of the leaves are between the cylinders and the belts. The yielding idler roller being located a short distance below the cylinders eliminates the employment of a long belt and at the same time it automatically compensates for the thickness of the pack of leaves and consequent pressure or draft on the portion of the belts coöperating with the cylinder. By reason of the tapered outline of the chute its narrowest portion being at its mouth the sections of the leaf cannot come into contact with the stem from the moment it is separated from the leaf.

The plate 29 is arranged between the two cylinders and as stated it carries the chute and the die or knife 26 which in conjunction with the rotary knife 24 strips the stem from the leaf. The plate as shown in Fig. 3 is mounted on a shaft 54 eccentrically journaled in bushes 55 carried by the frames. By actuating the bushes the plate oscillates and the die is moved to or from the knife and thus set in the proper position to compensate for the thickness of the leaf.

I claim:

1. In a machine for stripping and booking tobacco the combination with rotary oscillating cylinders, a revolving cutter, endless belts coacting with the cylinders to feed a leaf, a chute located behind the knife to divert the stripped stem, and a belt connecting the chute with the hub of the knife.

2. In a machine for stripping and booking tobacco the combination with rotary oscillating cylinders, a revolving cutter, endless belts coacting with the cylinders to feed a leaf, a chute located behind the knife to divert the stripped stem, a roller mounted on the chute, and a belt connecting the roller with the hub of the knife.

3. In a machine for stripping and booking tobacco the combination with rotary oscillating cylinders, a revolving cutter, endless belts coacting with the cylinders to feed a leaf, a chute located behind the knife to divert the stripped stem, a roller swingingly mounted on the chute, and a belt connecting the hub of the knife with the chute made to engage the stem for feeding it into the mouth of the chute.

4. In a machine for stripping and booking tobacco the combination with rotary oscillating cylinders, a revolving cutter, endless belts coacting with the cutter and the cylinders to feed a leaf, a chute located behind the knife to divert the stripped stem, a roller swingingly mounted on the chute, a belt connecting the hub of the knife with the central portion of the chute, and means on the chute for adjusting the roller to tension the belt.

5. In a machine for stripping and booking tobacco the combination with rotary cylinders, endless belts coacting with the cylinders to feed a leaf, a hanger to swingingly mount the cylinders, arms extending downwardly from the hanger between its fulcrum and weight, and yielding devices connected to the arms to balance the cylinders.

6. In a machine for stripping and booking tobacco the combination with rotary cylinders, endless belts coacting with the cylinders to feed a leaf, a hanger to swingingly mount the cylinders, arms extending downwardly from the hanger between its fulcrum and weight, coiled springs connected to the arms to balance the cylinders, a two armed rock lever fulcrumed below the cylinders, an idler roller carried by the lever to engage the belts, and yielding means coacting with the lever to tension the belts.

7. In a machine for stripping and booking tobacco the combination with a pair of rotary oscillating cylinders, a revolving cutter, endless belts coacting with the cutter and the cylinders to feed a leaf, a plate arranged between the cylinders, a die carried by the plate coacting with the cutter, and means including an eccentric mounting for the plate to swing the die to or from the cutter.

In testimony whereof I have hereunto set my hand in the presence of two subscribing witnesses.

JOHN LAURELL.

Witnesses:
Louis Joseph,
William Miller.